United States Patent [19]

Hamman

[11] Patent Number: 4,993,909
[45] Date of Patent: Feb. 19, 1991

[54] WHEEL RETAINER BLADES FOR WHEEL LIFT APPARATUS

[75] Inventor: Reed K. Hamman, Newbern, Tenn.

[73] Assignee: Holmes International, Chattanooga, Tenn.

[21] Appl. No.: 335,273

[22] Filed: Apr. 10, 1989

[51] Int. Cl.[5] .............................................. B60P 3/12
[52] U.S. Cl. ..................................... 414/563; 188/32; 410/30; 280/402; 414/427
[58] Field of Search ............... 414/563, 426, 427, 428, 414/429, 430, 462; 280/402; 188/32; 410/9, 19, 30, 66, 67

[56] References Cited

U.S. PATENT DOCUMENTS

| | | | |
|---|---|---|---|
| 1,733,269 | 10/1929 | Mauk et al. | 410/30 |
| 2,666,502 | 1/1954 | Fee | 188/32 |
| 2,725,958 | 12/1955 | Porter et al. | 188/32 |
| 3,845,845 | 11/1974 | Geisthoff | 188/32 |
| 3,973,651 | 8/1976 | Garrett et al. | 188/32 |
| 4,034,873 | 7/1977 | Haring | 414/563 |
| 4,264,262 | 4/1981 | Lo Codo | 414/563 |
| 4,573,857 | 3/1986 | Porter, Sr. et al. | 414/563 |
| 4,637,623 | 1/1987 | Bubik | 414/563 X |
| 4,679,978 | 7/1987 | Holmes et al. | 414/563 |
| 4,741,661 | 5/1988 | Carey | 414/563 |
| 4,742,967 | 12/1987 | Farthing | 280/402 X |
| 4,793,763 | 12/1988 | Bubik | 414/563 |

FOREIGN PATENT DOCUMENTS

| | | | |
|---|---|---|---|
| 102166 | 1/1961 | Denmark | 188/32 |
| 2829298 | 1/1980 | Fed. Rep. of Germany | 414/427 |
| 897582 | 5/1962 | United Kingdom | 188/32 |

Primary Examiner—Frank E. Werner
Attorney, Agent, or Firm—Alan Ruderman

[57] ABSTRACT

Apparatus for wheel lift towing vehicles for supporting the tires of a vehicle to be lifted and towed thereby includes a tire support cradle having front and rear support members for respectively engaging the front and rear surfaces of a tire of the vehicle to be towed. The front and rear members include an auxiliary foot in the form of a plate which is selectively connected to the members when operative or removed when inoperative for storage. Each plate when connected to the support members is disposed at an angular inclination for providing a support surface for engaging and aiding in supporting a respective surface of the tire. The rear plate may be connected after the rear support member has been positioned behind the tire beneath a low ground clearance disabled vehicle so that no interference with the vehicle occurs.

8 Claims, 1 Drawing Sheet

WHEEL RETAINER BLADES FOR WHEEL LIFT APPARATUS

BACKGROUND OF THE INVENTION

This invention relates to towing vehicles and more particularly to a wheel retainer support foot for wheel lift apparatus for supporting a front and/or rear portion of the tires of a vehicle to be lifted and towed.

Because of the large amount of plastic material used on the front and rear portions and bumpers of recent model automobiles, developments in the art of lifting and towing disabled vehicles by a towing vehicle have been directed toward what is known in the art as "wheel lift" devices, which engage and lift the front or rear tires of a disabled vehicle. Examples of towing apparatus incorporating such devices are illustrated in Wagner U. S. Pat. No. 3,182,829; Bubik U.S. Pat. No. 3,897,879; Cannon et al U. S. Pat. No. 4,451,193; Brown U.S. Pat. No. 4,473,334; Porter et al U.S. Pat. No. 4,573,857; Hamman U.S. Pat. No. 4,634,337; Bubik U.S. Pat. No. 4,637,623 and Holmes U.S. Pat. No. 4,679,978. As disclosed in each of these patents the tires of a disabled vehicle are disposed within the well of some form of cradle, the cradle having members which engage and support the front and rear of the tires carried therein.

The wheel supporting cradles generally have a fork of a substantially U-shaped configuration in plan, the legs of the cradle opening either inwardly, outwardly or rearwardly. In the latter instance the open position is closed by a retaining member subsequent to the tire being disposed within the well, the retaining member engaging the rear of the tire. In the former cases, the rear of the tire is engaged by an arm, commonly known in the art as an "L" arm since it has that configuration, and such arm may have an upstanding arcuate contour conforming somewhat to the shape of the tire so as to provide greater support by the larger surface contact with the tire. Examples of the former "L" arm configurations are illustrated in at least the aforesaid Porter et al and Holmes patent, while examples of the latter "L" arm configurations are illustrated in at least Wagner and the Bubik '623 patents.

The front of the tire generally merely rests on a ramp either formed on the front leg of the U-shaped cradle, as in Cannon et al and Porter et al, or formed on the rear of a laterally extending cross arm or tow bar which carries the "L" arms at its extremities, such as in Bubik '623 and Holmes. In Wagner, both the front and rear support for the tires is provided by spaced apart arcuate shaped plates or feet which are connected together by chains so that both the front and rear of the tire is engaged by the greater surface contact provided by these contoured feet. However, in Wagner the feet on both sides of the vehicle are carried by a respective arm depending downwardly from a frame supported above the vehicle to be towed, and the entire wheel lift apparatus is difficult to utilize effectively. This is one reason the art has developed in the direction of engaging the tires with a wheel lift device which enters from beneath the disabled vehicle.

When a disabled vehicle is being towed, it is highly desirable that the tires rest securely within the cradle so that the momentum of the disabled vehicle does not result in the tires rolling and disengaging from the cradle when the towing vehicle accelerates or stops. On acceleration, the disabled vehicle and the tires tend to surge rearwardly, but upon stopping of the towing vehicle, the disabled vehicle and the tires tend to surge forwardly. Accordingly, it is highly desirable to have enlarged wheel engaging feet at the front and rear of the cradle.

One of the problems presented when engaging the tires from beneath the vehicle is that modern automobiles have a low configuration, that is, they are built low to the ground and the bodies thereof have low ground clearance and small clearance between the tire wells and the tires. Thus, if the cradle has enlarged feet, the low clearance prevents the feet from entering beneath the automobile from, for example, the front of the vehicle. If a large foot is desirable to support the front of the tire of the disabled vehicle, then the prior art, as exemplified by the aforesaid Porter et al patent, has not utilized a foot at the rear of the tire but has provided means for rotating the rear support of the cradle outwardly from beneath the vehicle. However, even here if the disabled vehicle has a very low ground clearance at the front, the upstanding foot will not slip beneath the body of the vehicle into the tire engaging position. If a large foot is desired to support the rear of the disabled tire, the foot may be rotated inwardly from the outboard side of the vehicle, as exemplified by the Bubik '623 patent. However, as illustrated in that patent, the front support is merely a ramp on the cross bar or the like since a large foot for supporting the front of the tire will not enter beneath the low ground clearance front end of late model vehicles.

In Lock copending U. S. patent application serial No. 183,044 filed on April 19, 1988, now U.S. Pat. No. 4,859,134, dated Aug. 22, 1989 and assigned to Holmes International Inc., the same assignee of the present application, there is disclosed a pivotably foldable ramp juxtaposed adjacent to the fixed ramp at the front of the cradle, the foldable ramp providing an extension of the fixed ramp, and thus an enlarged foot at the front, when in an operative position, yet may be pivotably folded to an inoperative position which permits the support member on which it is mounted to enter beneath low ground clearance vehicles without presenting an obstacle thereto.

Additionally, as aforesaid, it also desirable to have an enlarged foot for supporting the rear surface of the wheel or tire of the vehicle to be towed. Although the Bubik '623 patent does disclose an enlarged upstanding foot or blade, it requires that the arm to which the foot is attached be rotated a substantial amount for the foot to be received behind the rear of the tire, and it must then be lifted in order to adjust the arm longitudinally to engage the rear surface of the tire with the blade. When positioning the support arm it is more natural to merely slide the arm forwardly to engage the blade against the rear surface of the wheel. However, with the small wheel well clearances of recent automobiles this cannot be accomplished with the prior art blades such as that illustrated in Bubik '623 since the blade provides an obstacle for substantial movement of the arm so that it must be rotated to position the blade to closely adjacent the rear surface of the wheel. Additionally, apparatus such as disclosed in Bubik '623 may not be used when the tire of the vehicle to be towed is immediately adjacent to a curb or the like unless the vehicle has a high wheel well clearance or else the top of the blade when rotated from the higher level of the curb will engage the body of the vehicle. Furthermore, when a disabled vehicle, such as one involved in an accident, has flats in one or more of the tires which are to be lifted, the vehicle must first be winched to dispose the tires properly for lifting by the cradles. In such instances, because of the flats, the tires are spread wide at the bottom so that if the arm of the cradle were adjusted to its full extent, either the crotch of the cradle would still be too small to straddle and grip the tire, or even if the cradle could straddle and grip the tire while on the ground, once the tow bar is lifted, the tire could slip through the cradle between the front and rear supports. Thus, it has been the practice in the art to use the tow bar itself to lift the vehicle off the ground and then place blocks beneath the tires. Thereafter the "L" arms are adjusted to the required size of the tire which is then positioned and supported by the cradle. The tow bar is then lifted further and the blocks are removed. Not only is this time consuming, but it can also cause damage to the vehicle and be unsafe.

One solution to this problem is provided in Lock et al copending U. S. patent application serial No. 194,855 filed May 17, 1988, now U.S. Pat. No. 4,904,146 dated Feb. 27, 1990 assigned to the same assignee of the present application. There the tire supporting cradle has an elongated arm adjustably carried by the beam and includes a leg spaced from the beam for disposition behind the tire of a vehicle to be towed while the beam is disposed in front of the tire, and the leg having a tire engaging plate hingedly moveable relative to the leg between an upstanding operative position and a reclined position to permit the plate to function as a ramp for the tire when winching the vehicle to position the tire relative to the cradle, and to permit the plate to enter behind the tire of low ground clearance vehicles including those closely adjacent a raised curb.

Thus, different apparatus is utilized for increasing the support surfaces at the front of the tires of a disabled vehicle provided in the aforesaid Lock U.S. Pat. No. 4,859,134 than is utilized for increasing the support surface at the rear of the tires in the aforesaid Lock et al U.S. Pat. No. 4,904,146. From a manufacturing standpoint, and from the standpoint of simplicity, it is preferable that the apparatus be standardized yet still provide the major advantages of these apparatus.

SUMMARY OF THE INVENTION

Consequently, it a primary object of the present invention to provide enlarged wheel engaging feet for the cradle of wheel lift towing apparatus, the feet being disposed for engaging the front surface and the rear surface of a tire of a disabled vehicle, the feet having substantially the same configuration and being removably secured to the cradle.

It is another object of the present invention to provide removable feet for attachment to the spaced lateral legs of the cradle of a wheel lift towing device for positioning in an operative disposition at the front and rear of the cradle for providing support to the front and rear surfaces of a tire of a disabled vehicle, the feet being removed from the legs when not in use and when positioning relative to the tires.

It is a further object of the present invention to provide apparatus for use in lifting and towing a disabled vehicle, the apparatus including a support cradle carried by a transversely extending support beam, the cradle having means for engaging and supporting the front and rear surfaces of a tire of the vehicle, said means including an elongated arm adjustably carried by the beam and a transverse leg adapted to be disposed behind the tire while the beam is disposed in front of the tire, the leg and the front portion of the cradle having removable plates adapted to be mounted thereon and removed therefrom, the plates providing enlarged wheel engaging feet so that the tire rests securely within the cradle, and the rear foot permitting entry behind the tire of a low ground clearance vehicle.

Accordingly, the present invention provides apparatus for wheel lift towing vehicles for supporting the tires of a vehicle to be lifted and towed thereby, the apparatus including a tire support cradle having front and rear support members for respectively engaging the front and rear surfaces of a tire of the vehicle to be towed. Each of the front and rear members, and preferably both, may include a foot in the form of a plate which is selectively connected thereto in an operative position or removed therefrom when inoperative. Each plate when connected to the respective support member is disposed at an inclination to the support member for providing a retaining surface for engaging and aiding in supporting a respective surface of the tire. The plates may be removed from the respective support member and stored, if desired, and the rear plate may be connected after the rear support member has been positioned behind the tire beneath a low ground clearance disabled vehicle so that no interference occurs therewith. With the rear plates removed a vehicle having flat tires may be winched over the transverse rear leg before the plates are installed. Once the plates are so positioned relative to the tires, the vehicle may be raised for towing.

In the preferred form of the invention the front support member is a laterally extending member telescopically carried by the tow bar, and the rear support member is a laterally extending bar carried at the end of an arm elongated at the front to rear direction, the arm being substantially normal to the front member and the rear bar and telescopically adjustably connected to the front support member. The arm together with the rear lateral bar is known in the art as an "L-arm" and may be removed from the front support member, positioned with the rear bar in the wheel well behind the tire and reconnected to the front bar at the desired position The rear plate may be connected to the rear bar prior or subsequent to the positioning of the L-arm. If it is connected subsequent to positioning of the L-arm, the wheel lift apparatus may be utilized to lift and tow even exceptionally low slung or low ground clearance sports vehicles and even where such vehicles are adjacent a curb with the tire spaced from the curb by the thickness of the arm of the L-arm, and as aforesaid even after winching of the disabled vehicle into the cradle.

BRIEF DESCRIPTION OF THE DRAWINGS

The particular features and advantages of the invention as well as other objects will become apparent from the following description taken in connection with the accompanying drawings, in which.

DESCRIPTION OF THE PREFERRED EMBODIMENT

Figure 1:
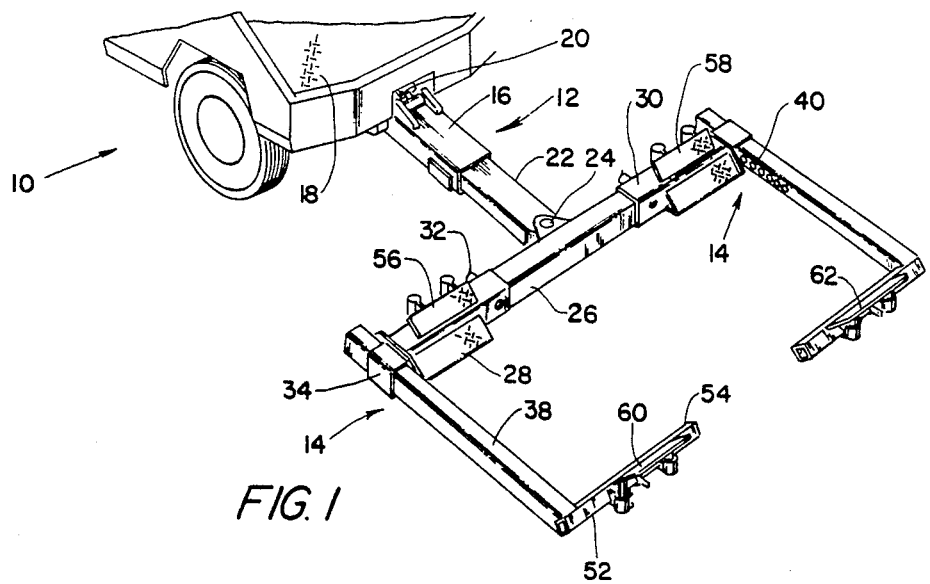
FIG. 1 is a rear perspective view of a portion of a towing vehicle looking forwardly having wheel lift apparatus illustrated as partly extended and incorporating wheel engaging cradles constructed in accordance with the principles of the present invention.

Referring to the drawings, a towing vehicle 10 is illustrated having wheel lifting apparatus 12 incorporating wheel supporting cradles 14 constructed in accordance with the principles of the present invention. The wheel lifting apparatus 12 includes a hollow boom housing 16 which may be extended by extension means disposed within the bed 18 of the towing vehicle, and may be titled by tilting means including a tilt cylinder 20 as fully disclosed in the aforesaid Hamman U.S. Pat. No. 4,634,337 assigned to the common assignee of the present invention. Telescopically disposed within the lifting boom housing 16 is at least one inner or lifting boom 22 which may be extended and retracted relative to the lifting boom housing 16 in conventional manner.

Mounted at the free end of the inner boom 22 by means of a journal pin 24 is a tow bar or cross beam 26 which may pivot relative to the inner boom 22 about the journal pin 24. At each end of the transversely extending tow bar is one of the wheel supporting cradles 14.

The wheel lift cradles 14 may be formed as separate attachments telescopically received on the ends of the tow bar 26 as illustrated, or each cradle may have elements formed integral with the tow bar. In either instance each cradle preferably includes a fixed front support ramp 28 secured to a support member, the support members preferably being hollow housings 30 conforming in shape to the tow bar and telescopically received on the opposed ends of the tow bar and locked thereon in transversely selected positions by spring biased pins 32 or the like. Each cradle includes a receptacle 34 fixed to the outer end of the support member 30 at the outboard side of the ramp 28, the receptacle comprising a hollow body having a rectangular passageway of a substantially fixed cross section throughout its length.

A rear wheel support member, i.e., a member for supporting the rear surface of the tire to be carried in the cradle includes an elongated arm 38 having a rectangular configuration conforming to the cross sectional configuration of the passageway in the receptacle 34 which is telescopically positioned within the receptacle 34 and locked therein by means of a pin (not illustrated) received within a selected one of a plurality of bores 40. The pin is disposed within and extends from each end of a cylindrical housing 42, illustrated in FIG. 5, which is secured to the inwardly facing surface of a plate 44 secured to the receptacle 34, the pin extending through the plate 44. The free extremity of the housing 42 has an inclined face 46 forming a cam surface. The pin is urged outwardly from the cylindrical housing at the plate end and the other end is secured within a plunger actuator cam 48 having a face similar to the face 46. A rod 50 or the like may be welded to the plunger actuator cam 48 so as to rotate that cam relative to the housing 42 to overcome the bias of an internal spring within the housing 42 and draw the pin into the housing to permit the arm 38 to be moved relative to the receptacle 34 or to permit the spring to force the pin outwardly so that it may be received in a selected one of the bores 40 to lock the arm to the housing 30.

The arm 38 has a fixed leg in the form of a bar 52 secured to and extending substantially normal thereto and spaced from the ramp 28 so that the bar 52 may be disposed behind a tire when the ramp is disposed in the front thereof. The bar 52 preferably is a hollow rectangular member secured to the arm 38 at an inclination so that one of the corners of the rectangular form is disposed at the top thereof and a surface 54 of the bar is inclined relative to the ground and faces forwardly so as to form a partial ramp surface.

In accordance with the present invention respective removable wheel engaging feet 56, 58, 60, 62 may be connected to the housings 30 at each end at the front of the cradle 14 and to the bars 52 at each end at the rear of the cradle. When connected to the cradle the feet 56 and 58 engage a portion of the front surface of a pair of tires of the disabled vehicle and the feet 60, 62 engage a portion of the rear surface of the tires. The feet 56 and 58 act in conjunction with the respective ramp 28 while the feet 60, 62 act in conjunction with the surface 54 of the respective bars 52 for providing support to the front and rear surfaces respectively of the tires.

Figure 2:
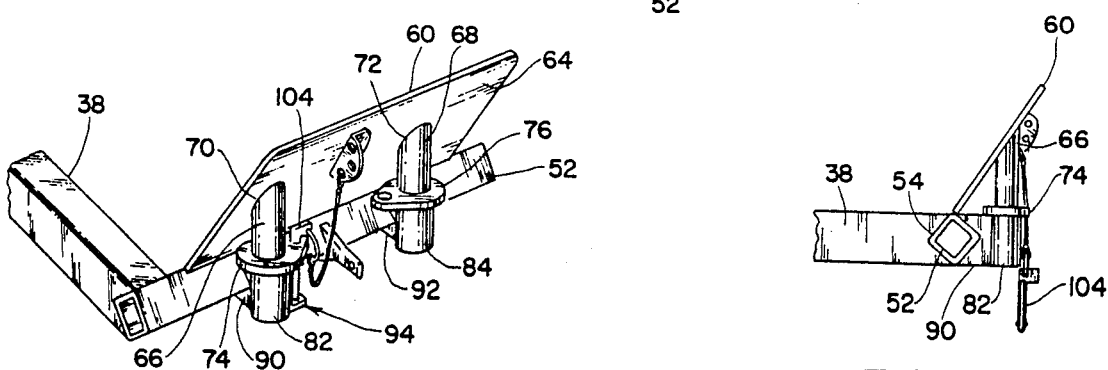
FIG. 2 is a fragmentary rear perspective view looking forwardly of the rear surface engaging portion of the cradle having a support foot constructed in accordance with the principles of the present invention.
Figure 3:
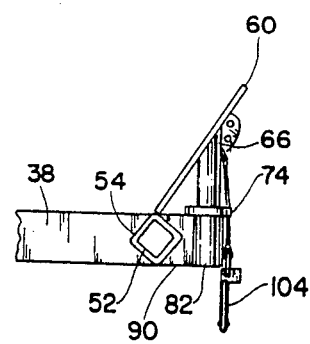
FIG. 3 is a side elevational view of the apparatus illustrated in FIG. 2.
Figure 4:
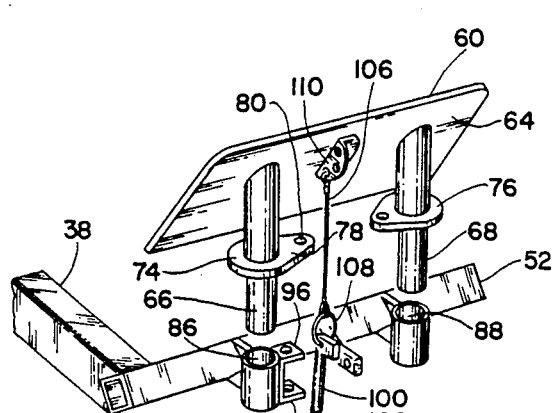
FIG. 4 is a view similar to FIG. 3 but with the plate disassembled from the rear support bar.

Except for minor variations which will become apparent due to differences in the configurations of the housing 30 and the bar 52 upon which respective feet are positioned, the feet 56, 58, 60, 62 are substantially identical. Referring to FIGS. 2 through 4, the foot 60 which is identical to the foot 62 comprises a plate constructed from steel or other structurally strong metallic material, and on the surface 64 opposed to the surface which is adopted to engage the tire includes a pair of spaced apart cylindrical rods or tubes 66, 68. The upper end 70, 72 of the respective rod 66, 68 is skewed and welded or otherwise fixedly attached to the surface 64, the angle of inclination of the skewed ends is such that when the rods 66, 68 are substantially vertically disposed the foot 60 is inclined relative to the axes of said rods and to the vertical plane rearwardly at the top edge so that the foot provides an extension of the surface 54 for engaging and aiding in supporting the rear surface of the tire. Intermediate the extremities of the rod 66, 68 there is fixedly attached a respective stop member 74, 76, the stop members being washer-like rings having outer diameters enlarged relative to the diameter of the rods and welded to the rods. One of the stop members, e.g., member 74 may have an enlargement 78 extending outwardly laterally relative to the axis of the rod, although for purposes of manufacturing and production efficiency both members, as illustrated, may have this configuration, and a bore 80 extends through the enlargement. The function of the enlargement 78 and the bore 80 will hereinafter become clear.

Secured as by welding or the like to the rear of the bar 52 is a pair of spaced apart socket housings or receptacles 82, 84, the sockets being hollow cylindrical members having respective bores 86, 88 of a diameter sufficient for receiving the portion of the rods 66 and 68 respectively below the respective stop member 74, 76. Additionally it should be clear that the length of the rods 66, 68 are such that their lower ends terminate in a plane below the lower edge of the plate 60 so that the rods may be recessed in the bores 86, 88 with the stop members disposed on the top surface of the sockets 82, 84. Since the rear surface of the bar 52 is inclined, and the sockets are cylindrical, additional struts or brackets 90, 92 preferably are welded to the bar 52 and the respective socket housing to ensure a secure attachment therewith. The spacing between the sockets 82, 84 is substantially equal to the spacing between the rods 66, 68 so that the lower portion of both rods may be received within the bores of the respective sockets. The stop members 74, 76 are located to abut the tops of the socket housings to limit the amount that the rods are received within the sockets and are disposed relative to the length of the rods so that when the stop members are at rest on the tops of the sockets, the tire engaging surface of the foot 60 forms a continuation of the surface 54 of the bar 52.

A C-shaped bracket 94 has its central leg welded to at least one of the sockets, e.g., socket 82, and the spaced legs or tines 96, 98 of the bracket 94 have bores aligned with the bore 80 in the enlargement 78 of the stop member 74 for receiving a locking pin 100 which in the operative position enters the bore 80, and the bores in the tines 96, 98. The locking pin 100 preferably includes a spring biased ball 102 at its lower end so that the pin must be forcibly pushed into and pulled out of the bores, and has an offset leg 104 at its upper end which rests on the enlargement 78 when in operative position so that the pin cannot slip through the bores. The pin 100 may thus act to lock the foot 60 to the bar 52 of the cradle as illustrated in FIG. 2 and may be retracted so that the foot may be removed from the cradle as illustrated in FIG. 4. For convenience, a cable 106 may be connected at one end to a ring 108 attached to the leg 104 and at its other end to a bracket 110 secured to the face 64 of the foot 60 so that the locking ring remains with the foot and does not get misplaced.

Figure 5:
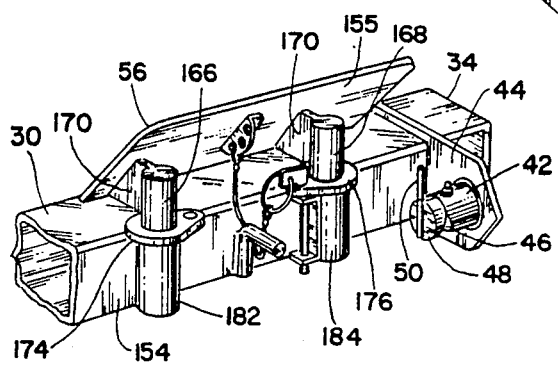
FIG. 5 is a fragmentary front perspective view looking rearwardly of the front surface engaging portion of the cradle constructed in accordance with the principles of the present invention.

The front feet 56, 58 are identical so that only foot 56 is described. As illustrated in FIG. 5 the feet 56, 58 are substantially the same as the feet 60, 62 except that because the top of the housings 30 are substantially horizontal and are wider than the bars 52 the connecting cylindrical rods or tubes 166, 168 are welded at the rear thereof to respective extender bars or legs 170, 172 which are in turn welded at a skewed edge to the forward facing surface 155 of the foot 56 so that when the rods 166, 168 are vertical the foot 56 is inclined. The legs 170, 172 permit the cylindrical rods 166, 168 to project beyond the front surface 154 of the housing 30 for receipt within respective sockets 182 and 184. Stop members 174, 176 identical to the members 74, 76 are positioned relative to the longitudinal extent of the rods 166, 168 so that the foot 56 may be disposed on the upper surface of the housing 30 at an appropriate angle for acting in conjunction with the ramp 28 to support the front surface of the tire. In all other respects the feet 56, 58 are the same as the feet 60, 62.

Thus, the feet 56, 58, 60, 62 may be removed and stored when not in use and connected to the respective housing 30 or bar 52 when needed. Additionally, for low slung or low ground clearance vehicles, the feet 60, 62 may be installed after the bars 52 are positioned behind the respective tires. In that manner they may be readily received behind the tire in the wheel well and then installed with the rods 66, 68 in the respective sockets 82, 84. Moreover, vehicles having flat tires may be winched over the bar 52 and the feet 60, 62 installed thereafter.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus for use with wheel lift towing equipment for supporting the tires of a vehicle lifted and towed thereby, said apparatus comprising a transversely elongated tow bar adapted to be positioned beneath said vehicle, mounting means for carrying a cradle at a respective opposite end portion of said tow bar for supporting a respective tire of said vehicle, each of said cradles having front support means for supporting a front surface portion of the respective tire and rear support means for supporting a rear surface portion thereof, said rear support means including an elongated arm and a leg secured to and extending transversely to the arm, means for mounting said arm to a respective end portion of said front support means such that said leg is spaced from said front support means, at least one enlarged surface tire engaging foot, said foot comprising a plate having a first surface adapted for engaging a tire and a second surface, first connecting means fixedly secured to said second surface, at least one of said front support means and said leg having second connecting means fixedly secured thereto, said first and second connecting means being selectively cooperable for removably mounting said foot at an angular inclination extending upwardly from and forming a continuation of said one of said front support means and said leg for engaging and aiding in supporting an adjacent surface of said tire.

2. Apparatus as recited in claim 1, wherein each of said mounting means and said leg includes said second mounting means for mounting a respective foot, the foot associated with said mounting means being inclined forwardly and upwardly, and the foot associated with said leg being inclined rearwardly and upwardly.

3. Apparatus as recited in claim 2, wherein said first connecting means comprises a pair of rods having a respective axis of inclination, means for fixedly attaching said rods to said second surface at spaced dispositions with the axis of each rod disposed at an inclination relative to said first surface, said rods being of a length such that at least one end of each rod terminates in a plane spaced below the lower edge of the plate and normal to the axis of the rod, and said second connecting means comprises socket means for receiving said rods.

4. Apparatus as recited in claim 3, wherein each rod includes a stop member secured thereto intermediate the longitudinal extremities of the rod, said socket means comprising a pair of hollow housings for receiving a respective rod, said stop means comprising an enlargement extending substantially normal to the axis of the rod and protruding beyond the periphery of the rod for resting on a respective housing when the rod is disposed within said socket.

5. Apparatus as recited in claim 4, wherein said leg includes a surface forming a continuation of the foot carried thereon.

6. Apparatus as recited in claim 4, wherein said front support means includes a ramp, and said foot carried by said front support means acts in conjunction with said ramp for supporting a front surface portion of the tire.

7. Apparatus for use with wheel lift towing equipment for supporting the tires of a vehicle lifted and towed thereby, said apparatus comprising a transversely elongated tow bar adapted to be positioned beneath said vehicle, mounting means for carrying a cradle at a respective opposite end portion of said tow bar for supporting a respective tire of said vehicle, each of said cradles having front support means for supporting a front surface portion of the respective tire and rear support means for supporting a rear surface portion thereof, said rear support means including an elongated arm and a leg secured to and extending transversely to the arm, means for mounting said arm to a respective end portion of said front support means such that said leg is spaced from said front support means, at least one enlarged surface tire engaging foot, said foot comprising a plate having a first surface adapted for engaging a tire and a second surface, first connecting means fixedly secured to said second surface, at least one of said front support means and said leg having second connecting means fixedly secured thereto, said first and second connecting means being selectively cooperable for mounting said foot at an angular inclination upwardly relative to said one of said front support means and said leg for engaging and aiding in supporting an adjacent surface of said tire, said first connecting means comprising a pair of rods having a respective axis of inclination, means for fixedly attaching said rods to said second surface at spaced dispositions with the axis of each rod disposed at an inclination relative to said first surface, said rods being of a length such that at least one end of each rod terminates in a plane spaced below the lower edge of the plate and normal to the axis of the rod, and said second connecting means comprises socket means for receiving said rods.

8. Apparatus as recited in claim 7, wherein each rod includes a stop member secured thereto intermediate the longitudinal extremities of the rod, said socket means comprising a pair of hollow housings for receiving a respective rod, said stop means comprising an enlargement extending substantially normal to the axis of the rod and protruding beyond the periphery of the rod for resting on a respective housing when the rod is disposed within said socket.

* * * * *